(12) United States Patent
Johnson

(10) Patent No.: US 7,683,661 B2
(45) Date of Patent: Mar. 23, 2010

(54) METHOD TO REDUCE THE PIN COUNT ON AN INTEGRATED CIRCUIT AND ASSOCIATED APPARATUS

(75) Inventor: David Edwin Johnson, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 0 days.

(21) Appl. No.: 12/201,893

(22) Filed: Aug. 29, 2008

(65) Prior Publication Data

US 2009/0058497 A1    Mar. 5, 2009

(51) Int. Cl.
G06F 13/38 (2006.01)
G06F 1/22 (2006.01)
H03M 1/66 (2006.01)

(52) U.S. Cl. .............................. 326/38; 326/93; 327/415
(58) Field of Classification Search .................... 326/38, 326/82, 93; 711/200; 327/415, 218
See application file for complete search history.

(56) References Cited

U.S. PATENT DOCUMENTS

| | | | |
|---|---|---|---|
| 5,691,659 A | 11/1997 | Riley | |
| 7,218,134 B1 | 5/2007 | Ho | |
| 7,492,217 B2 * | 2/2009 | Hansen et al. | ................. 330/10 |
| 2007/0126463 A1 | 6/2007 | Cox et al. | |
| 2007/0126465 A1 | 6/2007 | Cox et al. | |

FOREIGN PATENT DOCUMENTS

| | | |
|---|---|---|
| EP | 0 522 764 A2 | 1/1993 |
| EP | 1 544 630 A1 | 6/2005 |
| WO | WO 94/06210 | 3/1994 |

* cited by examiner

*Primary Examiner*—Daniel D Chang
(74) *Attorney, Agent, or Firm*—Dickstein Shapiro LLP

(57) ABSTRACT

A method and associated apparatus for enabling a plurality of functions of an integrated circuit to be controlled on a single pin of the circuit. The method includes the steps of providing each of the functions with a designated periodically recurring sampling instance during which time the status of a signal on the single pin will be considered to relate to the function designated to that sampling instance, and controlling each of the functions according to the status of the signal on the single pin during each of the plurality of functions' corresponding designated sampling instance.

31 Claims, 2 Drawing Sheets

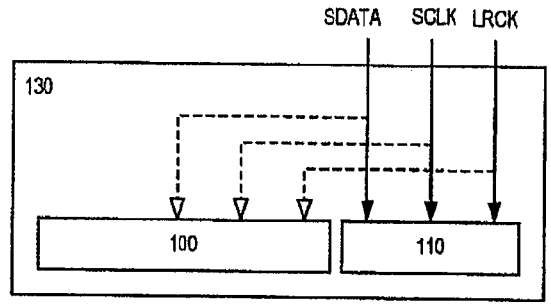
(PRIOR ART)  Fig. 1a
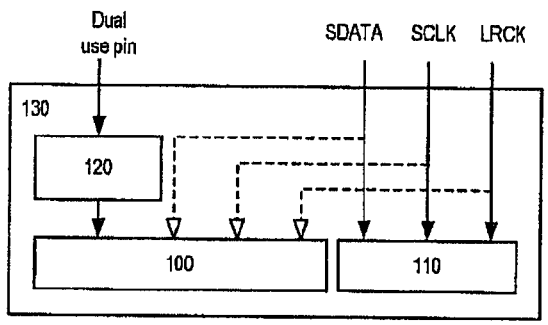
(PRIOR ART)  Fig. 1b
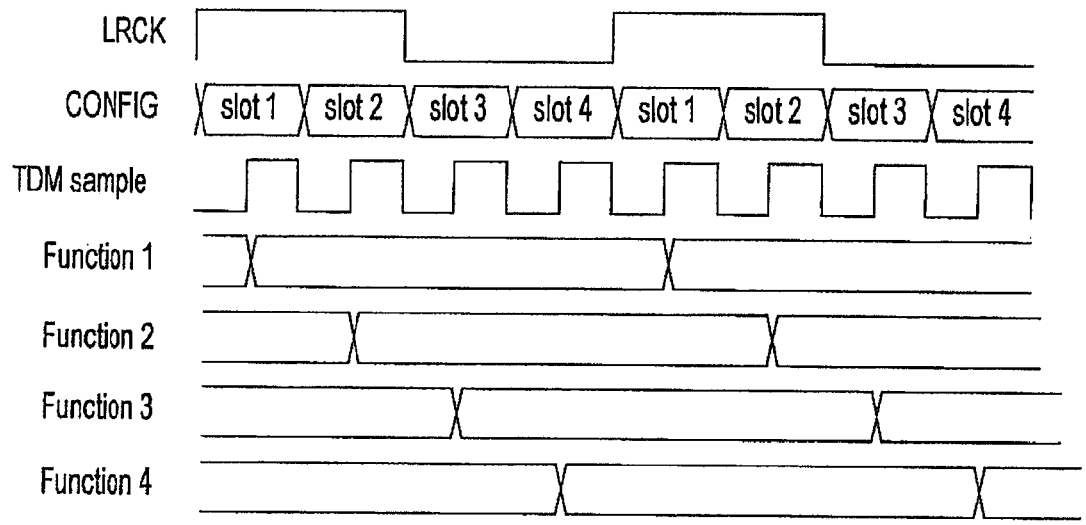
Fig. 2

METHOD TO REDUCE THE PIN COUNT ON AN INTEGRATED CIRCUIT AND ASSOCIATED APPARATUS

BACKGROUND OF THE INVENTION

1. Field of the Invention

The invention relates to a method to reduce the pin count on an Integrated Circuit (IC) and in particular a method for enabling a plurality of functions of an IC to be controlled on a single pin of said IC and apparatus incorporating an IC having an accordingly reduced pin count.

2. Description of the Related Art

As original equipment manufacturers of low cost consumer equipment are continually facing greater competition, there is drive to reduce printed circuit board (PCB) space and component costs in general. There is also a desire to use one component in several configurations, in a number of products. Therefore, it is desired that application-specific integrated circuits (ASIC) have fewer pins and more configurability.

FIG. 1a illustrates a prior art pin saving scheme, for a stereo audio digital-to-analog conversion (DAC) device having a three-wire serial interface comprising serial data (SDATA), serial data clock (SCLK) and left/right clock (LRCK) terminals. This arrangement allows at least one pin of said three-wire serial interface to be able to receive and differentiate between at least one of a plurality of functions.

In a known embodiment of the scheme of FIG. 1a, the SCLK terminal is also used to control de-emphasis filtering. In this case, should less than an arbitrary predetermined number of transitions be seen on the SCLK terminal during a left/right clock cycle, an internal serial clock is generated. This internal clock is used in place of the serial data clock in order to clock the serial data inputted on the SDATA pin, while the SCLK terminal is used for control of the de-emphasis filters. Alternatively, should more than an arbitrarily predetermined number of transitions be seen on SCLK terminal during a left/right clock cycle, it is assumed that this is a normal (external) serial data clock and the de-emphasis feature is disabled until the device is reset by a power cycle.

It should be noted that the above scheme has the scope to allow further configuration of the device. The device could be designed to recognise a multi-bit data sequence on the SCLK terminal at left/right clock rate. This could be used, for example, to change the serial data format or place the device into test mode. This configuration capability can be made available from power-up until the user presents an external serial clock.

The scope of the prior art also extends to DACs which combine the re-use of at least one of the three-wire serial interface pins in order to receive and differentiate between several functions, with an additional input terminal. The DAC recognises a data sequence on said additional input terminal as one or more of the group consisting of programming data and test data, and recognises a persistent logic level as data which is not programming data. An example of this is illustrated in FIG. 1b.

In a first aspect of the invention there is provided a method for enabling a plurality of functions of an integrated circuit to be controlled on a single pin of the circuit, the method comprising:

provlding each of the plurality of functions with a designated periodically recurring sampling instance during which time the status of a signal on the single pin will be considered to relate to the function designated to that sampling instance; and controlling each of the plurality of functions according to the status of the signal on the single pin during each of the plurality of functions' corresponding designated sampling instance.

In a further aspect of the invention there is provided an integrated circuit having a plurality of pins operable such that a plurality of functions can be controlled on a single pin, the circuit comprising:

means for providing each of the plurality of functions with a designated periodically recurring sampling instance during which time the status of a signal on the single pin will be considered to relate to the function designated to that sampling instance; and means for obtaining separate control signals for each of the functions from the signal on the single pin in order to enable control of each of the plurality of functions according to the status of the signal on the single pin during each of the plurality of functions' corresponding designated sampling instance.

In a yet further aspect of the invention there is provided a method for enabling a plurality of functions of an integrated circuit to be controlled on a single pin of the circuit, the method comprising:

providing each of the plurality of functions with a designated periodically recurring timeslot during which time the status of a signal on the single pin will be considered to relate to the function designated to that timeslot; and controlling each of the plurality of functions according to the status of the signal on the single pin during each of the plurality of functions' corresponding designated timeslot.

Other optional features of the invention are as described in the appended claims.

BRIEF DESCRIPTION OF THE DRAWINGS

Embodiments of the invention will now be described, by way of example only, by reference to the accompanying drawings, in which:

FIGS. 1a and 1b show two prior art integrated circuits with dual use pins;

FIG. 2 shows a timing diagram illustrating a multiplexing method on a single pin according to an embodiment of the invention;

DETAILED DESCRIPTION OF THE EMBODIMENTS

In order to reduce the overall pin count of an Integrated Circuit, it is proposed to use Time Division Multiplexing (TDM) techniques on one or more selected pins. This scheme differs from prior known schemes in that each function on a shared pin has its own dedicated timeslot, which is evaluated in a periodic manner.

FIG. 2 shows a timing diagram for an example TDM scheme which allows a single pin, "CONFIG", to control four (in this embodiment) different functions, each one having its own designated timeslot. The timeslot period is governed by the Left-Right clock signal LRCK, from which a TDM sample clock is generated. In the general case of n functions controlled by a single pin, n will typically be chosen to be a power of 2 in order to simplify the generation of the TDM sample clock within the device. In this embodiment, as there are four functions, the Left-Right clock period LRCK is divided into four TDM sample clock periods, each one of these representing a timeslot (Slot 1-Slot 4). The figure illustrates how each of the four respective functions (Function 1-Function 4) is updated during its designated timeslot (Slot 1-Slot 4), by the internally generated TDM sample signal. In practice, devices have auto-detection circuitry which determines the sample rate. This could be used to generate the sample enable for each function.

Figure 3:
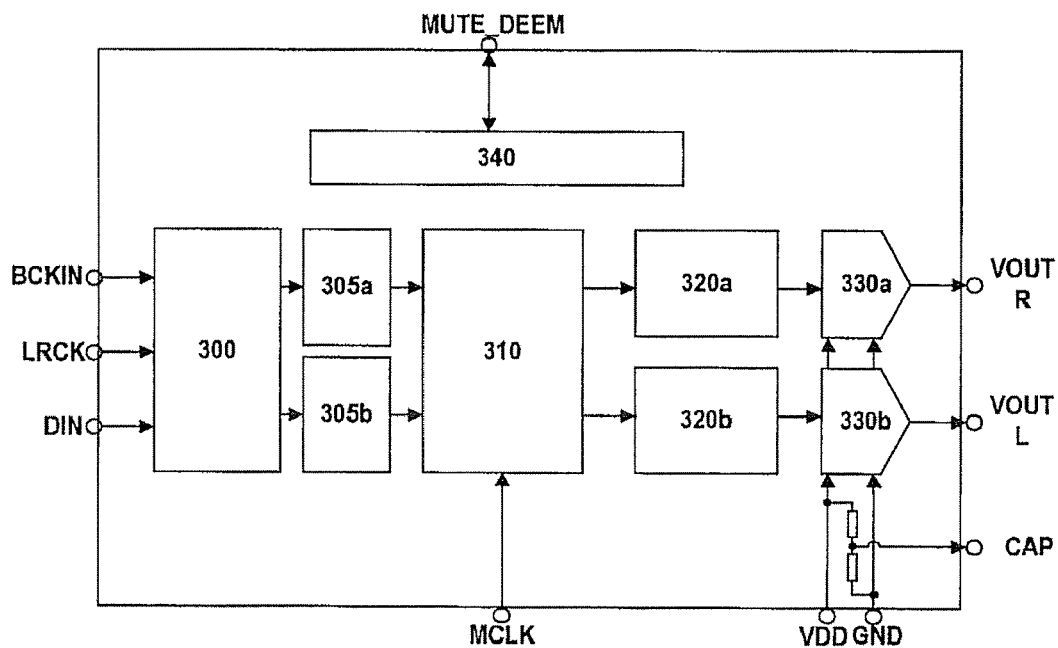
FIG. 3 shows a DAC integrated circuit according to an embodiment of the invention.

FIG. 3 shows an embodiment of the invention whereby de-emphasis and mute control is controlled on a single pin, "MUTE_DEEM", of a DAC (or ADC), using 2:1 TDM. Provided is a serial audio interface 300, having three inputs, these being: data in (DIN), Bit-clock in (BCKIN) and left-right word clock in (LRCK). The serial audio interface 300 also has left and right channel outputs. The output signals from each of these left and right channel outputs are then each passed through respective mute controls 305*a*, 305*b*, digital filters 310, sigma-delta modulators 320*a*, 320*b* and DACs 330*a*, 330*b*. Each output of the respective DACs 330*a*, 330*b* is routed to a respective output pin VOUTR, VOUTL. The other pins are the supply pins VDD, GND, the internal reference voltage pin CAP (connected to a capacitor—not illustrated), the master clock pin MCLK, and the dual purpose pin MUTE_DEEM.

Dual purpose pin MUTE_DEEM feeds into a control interface 340 which controls the mute controls 305*a*, 305*b* and the digital filters 310 which includes the de-emphasis filters (not illustrated). The mute function (MUTE) mutes the output of the DACs and is used, for example, to mute the output on start-up so as to prevent audible "on-pops". The de-emphasis function (DEEMPHASIS) is used to reverse the effects of pre-emphasis on a recording. Pre-emphasis may have been used on a recording to increase, within a band of frequencies, the magnitude of some (usually higher) frequencies with respect to the magnitude of other (usually lower) frequencies in order to improve the overall signal-to-noise ratio. De-emphasis filters will usually be switched on in response to a pre-emphasis data bit at the start of a particular recording, and will remain on throughout that recording.

By their very nature, MUTE and DEEMPHASIS are not two functions that would normally be used at the same time, as the MUTE function disables the output entirely (rendering the DEEMPHASIS function setting irrelevant). Also, while the MUTE function may be set at any time during a recording, the DEEMPHASIS function will only be switched on at the beginning of a recording and would not be expected to change throughout a recording. These features mean that these two functions MUTE and DEEMPHASIS are particularly suited to sharing a pin.

Figure 4:
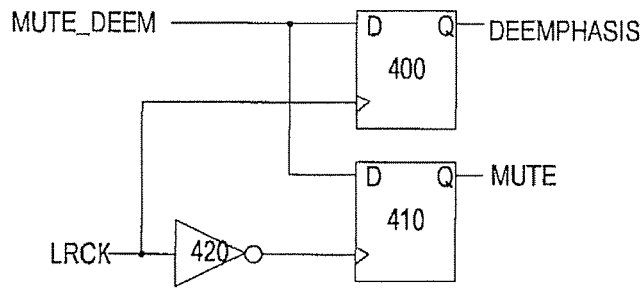
FIG. 4 shows a sampling circuit for the DAC of FIG. 3 to allow dual use of the MUTE-DEEM pin.

FIG. 4 shows a suitable sampling circuit in its simplest form. This sampling circuit would preferably be included on the Integrated Circuit of FIG. 3. The sampling circuit comprises two D-type flip-flops 400, 410 with the combined mute/de-emphasis signal MUTE_DEEM fed into the D inputs of both flip-flops 400, 410 and the Left-Right clock signal LRCK fed into the clock inputs of both flip flops 400, 410, one directly into flip-flop 400 and one via an inverter 420 into flip-flop 410. The De-emphasis signal DEEMPHASIS is taken from the output Q of the flip-flop 400 while the Mute signal MUTE is taken from the output Q of the flip-flop 410.

In use, the combined mute/de-emphasis signal MUTE_DEEM is sampled on the falling edge of the Left-Right clock LRCK to determine Mute control and on the rising edge of the Left-Right clock LRCK to determine De-emphasis control. Of course it will be appreciated by those skilled in the art that the opposite is also achievable with a similar design and control.

Figure 5:
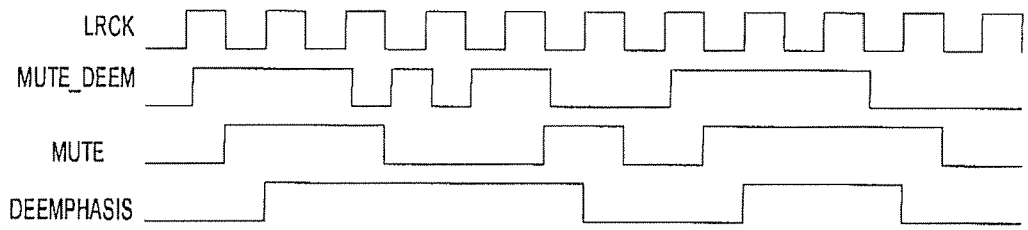
FIG. 5 shows a timing diagram illustrating a multiplexing method on the MUTE-DEEM pin according to an embodiment of the invention.

FIG. 5 is a timing diagram showing the de-multiplexing of the combined mute/de-emphasis signal MUTE_DEEM into the MUTE and DEEMPHASIS control signals. The signals shown are the combined mute/de-emphasis signal MUTE_DEEM, the Left-Right clock signal LRCK, and the de-multiplexed MUTE and DEEMPHASIS signals. As can be seen, when the combined mute/de-emphasis signal MUTE_DEEM is held high on a falling edge of the Left-Right clock LRCK, the MUTE signal is set, that is it. goes logic "high". If signal MUTE_DEEM is held low on the falling edge of signal LRCK then MUTE is reset. Similarly, the state of signal MUTE_DEEM on the rising edge of the Left-Right clock LRCK signal determines whether DEEMPHASIS is set.

Note that a persistent logic high on the MUTE_DEEM pin enables both the MUTE and DEEMPHASIS signals, while a persistent logic low disables both signals. The nature of the MUTE function (no output is heard when MUTE is enabled) means that in applications where de-emphasis is not required, holding the MUTE_DEEM signal persistently high or low will enable and disable the MUTE function, respectively. Care should be taken in the design of the mute and de-emphasis logic, so that no strange effects occur as a result of MUTE function being enabled just after DEEMPHASIS function is enabled, or the DEEMPHASIS function being disabled just after MUTE function is disabled.

In a further embodiment, the MUTE function may be a primary function, which is enabled/disabled in a TDM manner, as in the above example. However the DEEMPHASIS function may be made to be a secondary function which is dependent on the state of MUTE internally. To do this, the signal MUTE_DEEM could be Exclusive-ORed (XORed) with the internal MUTE signal, prior to multiplexing, to determine DEEMPHASIS. The benefit of this is that applying a persistent logic level would cause MUTE to be enabled/disabled, while DEEMPHASIS would remain disabled. DEEMPHASIS, on its own, is switched on if the MUTE-DEEM pin is high and the internal MUTE signal is low on the rising edge of signal LRCK.

In order to enable the MUTE and DEEMPHASIS functions, MUTE_DEEM would need to be high on a rising edge of the signal LRCK, and low on a falling edge of signal LRCK. It should be noted that in this embodiment it is still the case that both functions MUTE and DEEMPHASIS can only be changed in their own designated timeslot in an on-going periodic manner.

It is already known by the applicant to combine MUTE and Zero Detection functions on a mute/zero detect dual function pin. This is not done by using time division methods, but by having the pin act as both an input, driven by an output of another IC or controller whereby it functions to select MUTE or not-MUTE (logic high or low), or as an output, used for control of MUTE during Infinite Zero Detection (IZD) (logic "z" or floating). The IZD function detects a series of zero value audio samples of, say, 1024 samples long being applied to both left and right channels. After such an event, MUTE is set to ensure that there is zero output for zero input.

The above techniques can be combined to allow for Zero Detection (ZD) to also be used on the combined MUTE-DEEM pin (provided De-emphasis is off). However, this may require retiming of Infinite Zero Detection (IZD) flag to coincide with the 'mute' sample phase (or timeslot) of Left-Right clock LRCK. This is because, should Infinite Zero Detection IZD be asserted in such a way that the internal circuitry asserts DEEMPHASIS prior to MUTE, then there will be half a Left-Right clock LRCK cycle where the unwanted function, DEEMPHASIS is enabled, before MUTE is enabled (the desired function). This could lead to undesirable audible artifacts in the DAC output as the de-emphasis filters are temporarily activated for half a Left-Right clock LRCK cycle, post-mute or pre-mute. Retiming the output so that internal MUTE is asserted before DEEMPHASIS, and de-asserted after DEEMPHASIS, will ensure this is not the case.

It should be noted that the terms "MUTE-DEEM" and "LRCK" are used interchangeably to refer either to the pin of a chip, or to a signal being fed into that pin. It is clear from the context in each case, which is meant.

The skilled reader will appreciate that these and many other modifications and additions are possible to these methods and circuits, without departing from the spirit and scope of the invention as defined in the appended claims.

What is claimed is:

1. A method for enabling a plurality of functions, comprising de-emphasis and output mute functions of a converter device such as an analog-to-digital converter (ADC) or a digital-to-analog converter (DAC) in an integrated circuit, to be controlled on a single pin of said circuit, said method comprising:
    providing each of said de-emphasis and output mute functions with a designated periodically recurring sampling instance during which time the status of a signal on said single pin will be considered to relate to the function designated to that sampling instance; and
    controlling each of said de-emphasis and output mute functions according to the status of said signal on said single pin during each of said de-emphasis and output mute functions' corresponding designated sampling instance.

2. A method as claimed in claim 1 wherein said plurality of functions equal a number which is a power of two.

3. A method as claimed in claim 1 wherein said method uses a clock in order to determine said sampling instances.

4. A method as claimed in claim 3 wherein said clock is a secondary clock derived from an external clock inputted to another pin of said circuit.

5. A method as claimed in claim 4 wherein the total number of sampling instances occurs within one period of said external clock.

6. A method as claimed in claim 4 wherein said method uses either a rising or falling edge of said secondary clock to trigger any change in status of the relevant function, as appropriate based on the status of the signal on said single pin of said circuit.

7. A method as claimed in claim 4 wherein said method uses both a rising and falling edge of said clock to trigger any change in status of the relevant function, as appropriate based on the status of the signal on said single pin of said circuit.

8. A method as claimed in claim 3 wherein said clock is an external clock inputted to another pin of said circuit.

9. A method as claimed in claim 8 wherein said number of functions is two and said method is able to differentiate between a rising and falling edge of said clock by using a rising edge to trigger any change in status in one of said two functions and allow a falling edge to trigger any change in status of the other of the two functions.

10. A method as claimed in claim 1 wherein each of said sampling instances comprises a timeslot.

11. A method as claimed in claim 1 wherein said de-emphasis function is made dependent on the status of the output mute signal as well as the status of the signal on said single pin such that de-emphasis is enabled should only one of these signals be high during the appropriate timeslot.

12. A method as claimed in claim 1 wherein said converter device is a stereo converter device and said external clock comprises the left/right clock.

13. A method as claimed in claim 1 wherein said single pin is also used as an output for a further function.

14. A method as claimed in claim 13 wherein said further function is for the purposes of zero detection.

15. A method for enabling two functions of an integrated circuit to be controlled on a single pin of said circuit, said method comprising:
    providing each of said two functions with a designated periodically recurring sampling instance during which time the status of a signal on said single pin will be considered to relate to the function designated to that sampling instance; and
    controlling each of said two functions according to the status of said signal on said single pin during each of said two functions' corresponding designated sampling instance;
    wherein an external clock inputted to another pin of said circuit is used in order to determine said sampling instances;
    wherein said method is able to differentiate between a rising and falling edge of said clock by using a rising edge to trigger any change in status in one of said two functions and allow a falling edge to trigger any change in status of the other of the two functions; and
    wherein said signal from said single pin is fed into the D inputs of two D-type flip-flops, said clock being fed into the clock input of one of the D-type flip-flops directly and into the clock input of the other D-type flip-flop via an inverter, the two D-type flip-flop outputs providing the signals for controlling said two functions.

16. An integrated circuit having a plurality of pins, said circuit being operable such that two functions can be controlled on a single pin, said circuit comprising:
    a clock for providing each of two functions with a designated periodically recurring sampling instance during which time the status of a signal on said single pin will be considered to relate to the function designated to that sampling instance, wherein said clock is a secondary clock which in use is derived from an external clock inputted to another pin of said circuit, said circuit being operable to source said clock from an external clock inputted to another pin of said circuit; and
    two D-type flip-flops and an inverter operable to differentiate between a rising and falling edge of said clock by using a rising edge to trigger any change in status in one of said two functions and using a falling edge to trigger any change in status of the other of the two functions, wherein said two D-type flip-flops and said inverter are arranged such that said signal from said single pin is fed into the D inputs of said two D-type flip-flops, and wherein said clock is arranged to be fed into the clock input of one of the D-type flip-flops directly and into the clock input of the other D-type flip-flop via said inverter, the two D-type flip-flop outputs providing separate signals for controlling said two functions according to the status of said signal on said single pin during each of said two functions' corresponding designated sampling instance.

17. An integrated circuit as claimed in claim 16 arranged such that said plurality of functions equal a number which is a power of two.

18. An integrated circuit as claimed in claim 16 operable such that the total number of sampling instances occurs within one period of said external clock.

19. An integrated circuit as claimed in claim 16 operable such that either a rising or falling edge of said secondary clock is used to trigger any change in status of the relevant function, as appropriate based on the status of the signal on said single pin of said circuit.

20. An integrated circuit as claimed in claim 16 operable such that both a rising and falling edge of said clock is used to trigger any change in status of the relevant function, as appropriate based on the status of the signal on said single pin of said circuit.

21. An integrated circuit as claimed in claim 16 wherein each of said sampling instances comprises a timeslot.

22. An integrated circuit as claimed in claim 16 wherein said circuit is a converter device such as an analog-to-digital converter (ADC) or a digital-to-analog converter (DAC) and wherein said two functions comprise de-emphasis and output mute.

23. An integrated circuit as claimed in claim 22 operable such that said de-emphasis function is made dependent on the status of the output mute signal as well as the status of the signal on said single pin such that de-emphasis is enabled should only one of these signals be high during the appropriate timeslot.

24. An integrated circuit as claimed in claim 22 wherein said converter device is a stereo converter device and said external clock comprises the left/right clock.

25. An integrated circuit as claimed in claim 16 operable such that said single pin can also be used as an output for a further function.

26. An integrated circuit as claimed in claim 25 wherein said further function is for the purposes of zero detection.

27. Audio apparatus comprising the integrated circuit as claimed in claim 16.

28. Audio apparatus as claimed in claim 27 wherein said integrated circuit is in the form of a digital to analog converter for providing an analog signal, said audio apparatus further comprising amplification circuitry for amplifying said analog signal.

29. Audio apparatus as claimed in claim 27 further comprising storage means for storing audio content in a digital form.

30. Audio apparatus as claimed in claim 27 in portable form.

31. Communications apparatus incorporating audio apparatus as claimed in claim 27.

* * * * *